(12) United States Patent
Miller et al.

(10) Patent No.: US 11,582,244 B2
(45) Date of Patent: Feb. 14, 2023

(54) ACCESS CONTROL OF ADMINISTRATIVE OPERATIONS WITHIN AN APPLICATION

(71) Applicant: International Business Machines Corporation, Armonk, NY (US)

(72) Inventors: Swaha Miller, Saratoga, CA (US); Jose Manuel Gomez Claros, Emeryville, CA (US); Stephen Lockhart Hull, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 15/467,460

(22) Filed: Mar. 23, 2017

(65) Prior Publication Data
US 2018/0278614 A1  Sep. 27, 2018

(51) Int. Cl.
*H04L 29/06* (2006.01)
*H04L 9/40* (2022.01)
*G06F 21/60* (2013.01)

(52) U.S. Cl.
CPC .......... *H04L 63/105* (2013.01); *G06F 21/604* (2013.01); *G06F 2221/2141* (2013.01)

(58) Field of Classification Search
CPC .................................. H04L 9/00; G06F 21/00
See application file for complete search history.

(56) References Cited

U.S. PATENT DOCUMENTS

| | | | |
|---|---|---|---|
| 7,013,485 B2 | 3/2006 | Brown et al. | |
| 8,402,266 B2 | 3/2013 | Grebenik et al. | |
| 2005/0246762 A1 | 11/2005 | Girouard et al. | |
| 2008/0184336 A1 | 7/2008 | Sarukkai et al. | |
| 2008/0271121 A1* | 10/2008 | Hinton ................ | H04L 63/0815 726/4 |
| 2012/0198205 A1* | 8/2012 | Eilert .................... | G06F 11/302 711/206 |
| 2014/0143216 A1* | 5/2014 | Shear .................. | G06Q 20/3674 707/694 |
| 2015/0163158 A1 | 6/2015 | Ryland | |

FOREIGN PATENT DOCUMENTS

CN          102495985          6/2012

* cited by examiner

*Primary Examiner* — Beemnet W Dada
*Assistant Examiner* — Leynna Truvan
(74) *Attorney, Agent, or Firm* — Jeffrey S. LaBaw; David H. Judson

(57) ABSTRACT

A technique to implement access control from within an application begins by dynamically-generating a "management scope" for a transaction associated with a set of managed resources. The management scope is a collection of permissions defined by at least one of: a set of roles, and a set of resource administration rights, that are assigned to a first operator that issues the transaction. As the transaction executes, a request to alter the transaction is then received from a second operator. According to the technique, the management scope for the transaction and associated with the first operator is then evaluated against a management scope associated with the second operator. Upon determining the management scope associated with the first operator has a given relationship to the management scope for the second operator, the transaction is permitted to be altered in response to the request. The given relationship is scoped by one or more rules.

18 Claims, 5 Drawing Sheets

ACCESS CONTROL OF ADMINISTRATIVE OPERATIONS WITHIN AN APPLICATION

BACKGROUND

Technical Field

This disclosure relates generally to controlling access to resources being managed in a computer network.

Background of the Related Art

When defining an access control policy for an organization a common approach is to implement Role Based Access Control (RBAC). Using RBAC, entitlements to perform particular functions are assigned to roles instead of directly to users. The way a user gets the entitlements is by being assigned to roles or requesting membership of the role. Thus, to define an RBAC-based policy for an organization, an understanding of the user roles and the entitlements for those roles is required. Once this information is understood for an organization, the appropriate RBAC policy can be defined and deployed to an Identity Management system, such as IBM® Tivoli® Identity Manager™. Use of such tools greatly simplifies access management as compared with directly defining a user-to-entitlement relationship.

Access control for applications is usually granted through user groups defined and controlled by an underlying operating system (OS) of a computing system. Typically, there are administrator and non-administrator groups with different levels of privilege. A member of the administrator group can control application processes initiated by a member of a non-administrator group. Within some applications, however, there is a need to grant access privilege to one user on actions initiated by a different user. This access privilege, however, is limited to the application only. Thus, access control groups in the OS (which apply to all applications) cannot be used to determine whether the access privilege should be granted. Moreover, specific operations within an application are not visible to the operating system, which only sees application processors. Thus, the need to grant access privilege in this context needs to be solved with access control implemented "within" the application. This requirement often arises in management applications where multiple application users share the responsibility of administering the same resources. Examples of such applications include, without limitation, security management systems and data center management systems.

One way to approach this need is to add an operation on a transaction as a new security resource (within the access control system) being controlled via additional permissions or role mappings. That approach, however, increases management complexity and is error-prone.

There remains a need in the art to provide enhanced access control techniques that address this and other problems associated with the prior art.

BRIEF SUMMARY

A technique to implement access control from within an application begins by dynamically-generating a "management scope" for a transaction associated with a set of managed resources. The management scope is a collection of permissions defined by at least one of: a set of roles, and a set of resource administration rights, that are assigned to a first operator that issues the transaction. As the transaction executes, a request to alter the transaction is then received from a second operator. According to the technique, the management scope for the transaction and associated with the first operator is then evaluated against a management scope associated with the second operator. Upon determining the management scope associated with the first operator has a given relationship to the management scope for the second operator, the transaction is permitted to be altered in response to the request. The given relationship is scoped by one or more rules.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
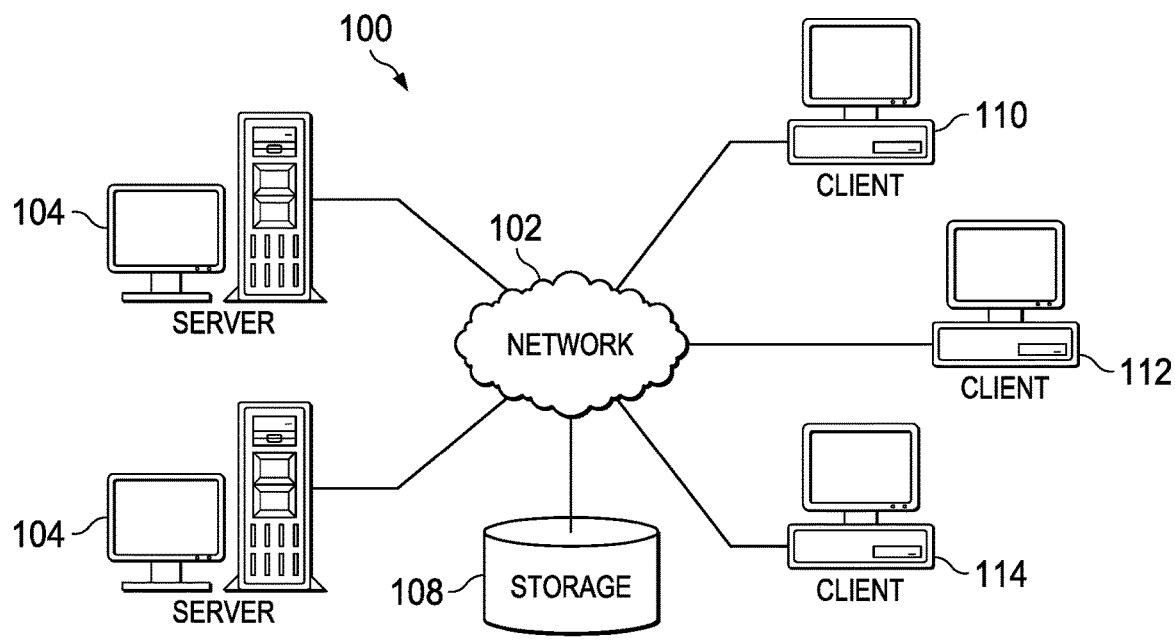
FIG. 1 depicts an exemplary block diagram of a distributed data processing environment in which exemplary aspects of the illustrative embodiments may be implemented.
Figure 2:
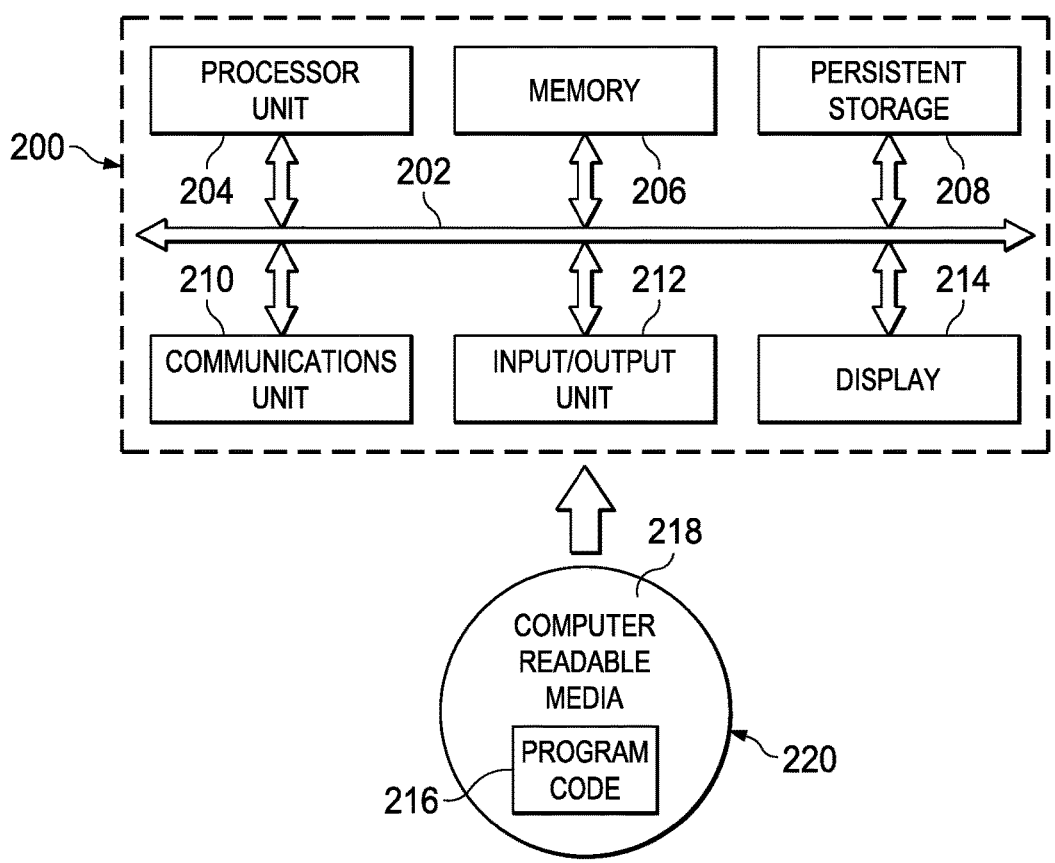
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
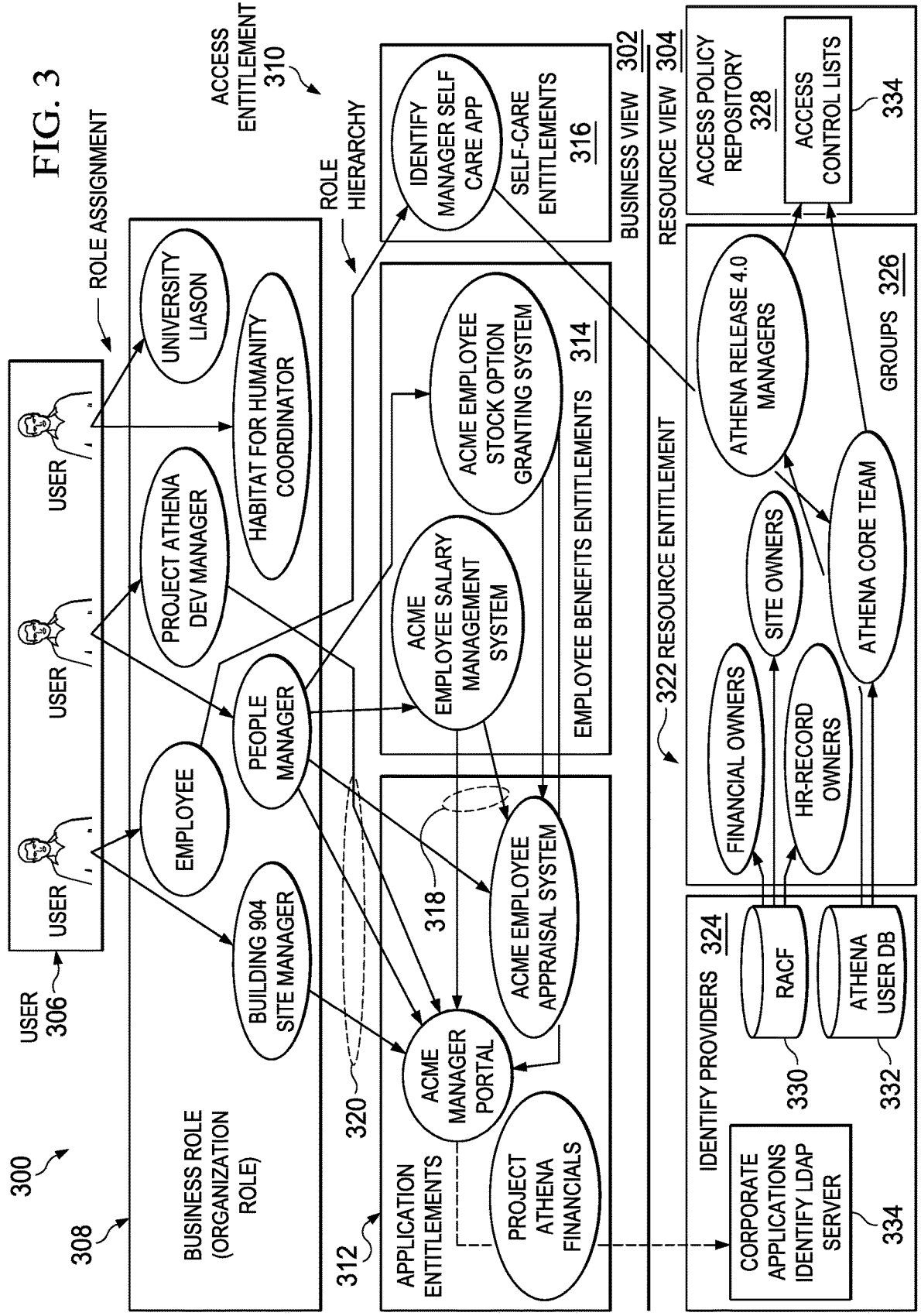
FIG. 3 is a block diagram of an exemplary business model built around an access entitlement framework and in which the disclosed technique may be implemented.

By way of further background, FIG. 3 is a block diagram of an access entitlement framework comprising an access entitlement entity model and role-based access control. The access entitlement framework is provided by an identity management system, such as, for example, IBM® Tivoli® Identity Manager™. Business model 300 in FIG. 3 may be used to support logical provisioning of business applications within the context of an identity management system. In particular, business model 300 is used to abstract the concept of access entitlement to one more aligned with a business perspective. The abstraction of access entitlement from a business perspective de-couples the implementation details of the IT infrastructure to support access control and allows the same business model to be applied to different IT environments without any impact on the access privileges of the business users.

Business model 300 is shown to comprise a business view 302 and a resource view 304. A business view is the business-oriented description of the roles and access privileges so that it can be understood by business users. The roles are defined based on business related job functions for the user. The business-oriented description describes the access privileges in the context of a specific business domain, such as what an accountant can do in an accounting application. A resource view describes the details about the underlying access control system that provides a safeguard to the corresponding business applications. For example, the details may include information about the identity service provider to authenticate the subject user and provide identity and attributes for the user, information about the policy provider in which the access control policy is defined to specify user entitlements, and system specific permissions (e.g., access control lists (ACLs)).

In this illustrative example, a company, Acme Inc., employs an identity management system in its business model. Within business view 302, user attributes specific to an organizational role and access entitlement to resources are supported via role assignment, which includes assigning a user to one or more business roles in the organization. Organizational roles are used to group people according to their function in the organization. All Acme employees are granted the employee role in the organization. For example, a user 306 may be assigned to one or more organizational roles 308 in a company, such as, for example, site manager, project manager, HR manager, and the like, as well as ancillary employee roles such as university liaison or community coordinator. Assignment of a user to an organizational role enables role-based provisioning of access entitlements to managed resources. For example, services in an identity manager represent different types of managed resources, such as Oracle® databases, Windows® machines, and the like. An organizational role may be linked to services by means of provisioning policies, entitling persons in the organizational role to an account on the managed resource that is linked to that service.

In addition, one or more access entitlements may be assigned to a user or to an organizational role. Access entitlements 310 specify permissions given to a user or organizational role to access managed resources. Within the access entitlement framework, access entitlement comprises a set of attributes that describes the business perspectives of the access privilege and contains a set of resource entitlements that defines what entitles the user to have the access privilege with a specific resource infrastructure. The set of attributes that describes the access privilege may include the name of the access privilege, the access privilege type (business category), the description of the access privilege, and other access-specific custom attributes from a business perspective.

In this example, access entitlements 310 comprise application entitlements 312, employee benefits entitlements 314, and self-care entitlements 316. A user 306 or organizational role 308 may gain access to an application if the access entitlements in application entitlements 312 specify that user 306 or organizational role 308 has access privileges to the application resource. For example, all managers at Acme have access to the Acme manager portal in application entitlements 312. Only people managers may have access to application access entitlements, such as the employee salary management system or the employee stock option granting system in employee benefits entitlements 314.

Role hierarchies/dependencies may be built among access entitlements (e.g., lines 318) or organizational role and access entitlement (e.g., lines 320) and be integrated into the organizational role hierarchy. Role hierarchies/dependencies specify a prerequisite for obtaining access to an application. For instance, a user may be granted access to application A only if the user also has access to application B. Thus, the user's access to application A is dependent upon also having access to application B. In this illustrative example, access entitlements to the employee salary management system or the employee stock option granting system are dependent on access entitlements to the employee appraisal system and the manager portal in application entitlements 312 being granted.

Access entitlement types include group entitlement, ad hoc rule entitlement, and composite entitlement. Group entitlement comprises access entitlements fulfilled by organizational role membership in the context of a single identity service provider. Ad hoc rule entitlement comprises access entitlements fulfilled by a Boolean rule defined on set of user attributes in the context of a single identity service provider. Composite entitlement comprises access entitlements fulfilled by multi-resource entitlements in the context of different identity service providers. A multi-resource entitlement comprises access to multiple elements. For instance, a user is granted access to application D. In this example, application D is an aggregated element which comprises applications A, B, and C. Thus, if a user requests access to application D, the user may also obtain access to applications A, B, and C when access to application D is granted.

The managed resources that an identity manager provides provisioning for are represented as services. Within resource view 304, resource entitlements 322 define the conditions in which an access entitlement, such as an entitlement in application entitlements 312, employee benefits entitlements 314, or self-care entitlements 316, may be fulfilled for a user with a specific identity provider. Identity providers 324 are authentication authorities which issue and validate user identities and access entitlements for a set of users. The business organization may act as an identity provider for users 306. Identity providers 324 use the conditions in which an access entitlement may be fulfilled to generate a Boolean rule that is used to evaluate if a specific user has the access entitlement, as well as to discover existing user entitlements. The rule may also be used to generate a set of attributes with which the rule provisions the access entitlement for a user. Resource entitlements may be managed in groups, as shown by resource entitlement groups 326. Identity providers 324 may instantiate access entitlement for a user via a set of accounts on related services. An account may contain the user identity, profile attributes, access entitlement attributes (permission attributes), and access specific attributes for the user. An administrative owner can be identified for the access entitlement so that the administrative owner may participate in any lifecycle management process related to the access entitlement, including the access request approval and access recertification process. An existing resource entitlement in the framework may be managed directly as an access entitlement, or it can bind to an abstracted access entitlement object which de-couples any specific dependencies of the framework but contains the static business description of the access privilege.

In this illustrative example, identity providers 324 include Resource Access Control Facility (RACF) 330, Athena user database 332, and corporate LDAP server 334. RACF 330 hosts identities that pertain to any financial management systems (e.g., salary, stock, financial systems). Athena user database 332 hosts identities for applications that pertain to operational systems (e.g., site maintenance applications). Corporate LDAP server 334 hosts identities for people working on the Athena project and is concerned with protecting access to the Athena project.

Modeling of the access entitlement as a manageable entity allows access entitlement to be unified into the RBAC model to support various security policies in access policy repository 328 around access entitlement. An access entitlement may be viewed as a system or application role, and may be associated with business roles. Security policies in access policy repository 328 may be used to define relationships between different organization roles 308, between an organizational role 308 and access entitlements 310, and between different access entitlements 310. Semantics supported in such relationships include inheritance, allow (privileged or granted), relationship constraints, and attribute constraints. An inheritance relationship implies that one role will automatically inherit all privileges of the other role. The privilege inheritance is automatic and enforced consistently. An allow relationship (privileged or granted) implies that membership in one role allows a user to request another role explicitly. The other role may be granted to the user upon the completion of a business workflow. Relationship constraints are a set of constraints that are defined among the different types of roles, including business roles and application roles. For example, the constraints of "separation of duty" may be defined statically or dynamically to prevent a user from having multiple roles. Attribute constraints are a set of constraints which define the user-role assignment restrictions when a role is assigned to user.

In a representative embodiment, the identity manager 302 is Tivoli Identity Manager, the access manager is Tivoli Access Manager for Enterprise Single Sign-On (TAM E-SSO), and the directory integrator is Tivoli Directory Integrator (TDI).

An RBAC data model may be defined as follows.

An entity, like a person or organization, has one or more identities in a given context, and each identity defines a set of characteristics (defined by a set of attributes and related information) that represent various views of the entity within that context. A human being typically has many identities. Thus, for example, assume Bob Smith as a person has an identity relevant to his employer (e.g., IBM). Bob Smith as an entity has an identity (with his email as identifier—bsmith@us.ibm.com, and with attributes like level, location, and the like), and this identity is relevant to a given context (e.g., IBM Bluepages). Similarly, Bob Smith has an identity as an employee (to his employer), as a citizen (to the government), and so forth, with respect to any person, organization, group or device type. An identity thus has a set of attributes that defines the characteristics of that entity. Some of those attributes are relevant to that identity in a given context (e.g., name, account number, etc.), and some are specific to particular roles that the identity may take on in that given context. Some of these attributes may also be shared across different contexts. Thus, for example, Bob Smith may have attributes, such as email-address, phone number, passport information, fingerprint data, or the like that may be shared with others, such as his employer, port control authority, or the like. Bob Smith may have a specific attribute, such as platinumCustomer, and preferredColor, in the context of "customer" to an entity such as Clothes-R-Us. As also noted, an identity can be identified by one or more identifiers, e.g., email id, short name, etc. An identity may have multiple authenticators. A given authenticator may only validate some of the attributes and not all of them (e.g., a password is sufficient to identify a Teller role, but not Supervisor role). Some authenticators may be self-managed identifiers, assigned by a naming authority, or merely system identifiers. Among these, there may be one identifier (e.g., X.500 name) that uniquely identifies that identity in a given context. Thus, a given identity has at least one attribute that acts as an identifier. For example, Bob Smith may have a "bob" identifier in Company A's system, an identifier bsmith@us.ibm.com in his employer's system, an identifier SSN in a Government system, and so forth. Example types of relationships between identities are (a) an entity Bob Smith can have an identity bsmith (as identifier) in IBM and bsmith (as identifier), and those two identities can be related, (b) an organization identity (e.g., SWGOrg) has its employees (person identities), (c) a group identity, USTennisTeam, is related to its constituent players (d) person identity bsmith is related to a device identity cell-phone sim #1234, and so forth. An identity can take on zero or more roles. The scope of a given role is relevant to the appropriate context. By taking on a role, an identity may include additional attributes. e.g., PCP has <patientList, specialty>. A financialAdvisor role may have <certificationLevel, adviseeList>, etc. Such attributes that are specific to a role are typically given values (e.g., specialty is 'cardiologist') when the role is assigned to an identity and, thus, the values of those role specific attributes are specific to a given identity. Attributes may also be independent of role, e.g., "location=NewYork," which in a given use case might apply that users in a primary care physician (PCP) role and in New York would have the privilege to treat patients in that State.

Access Control of Administrative Operations Within an Application

With the above as background, the techniques of this disclosure are now described.

Figure 4:
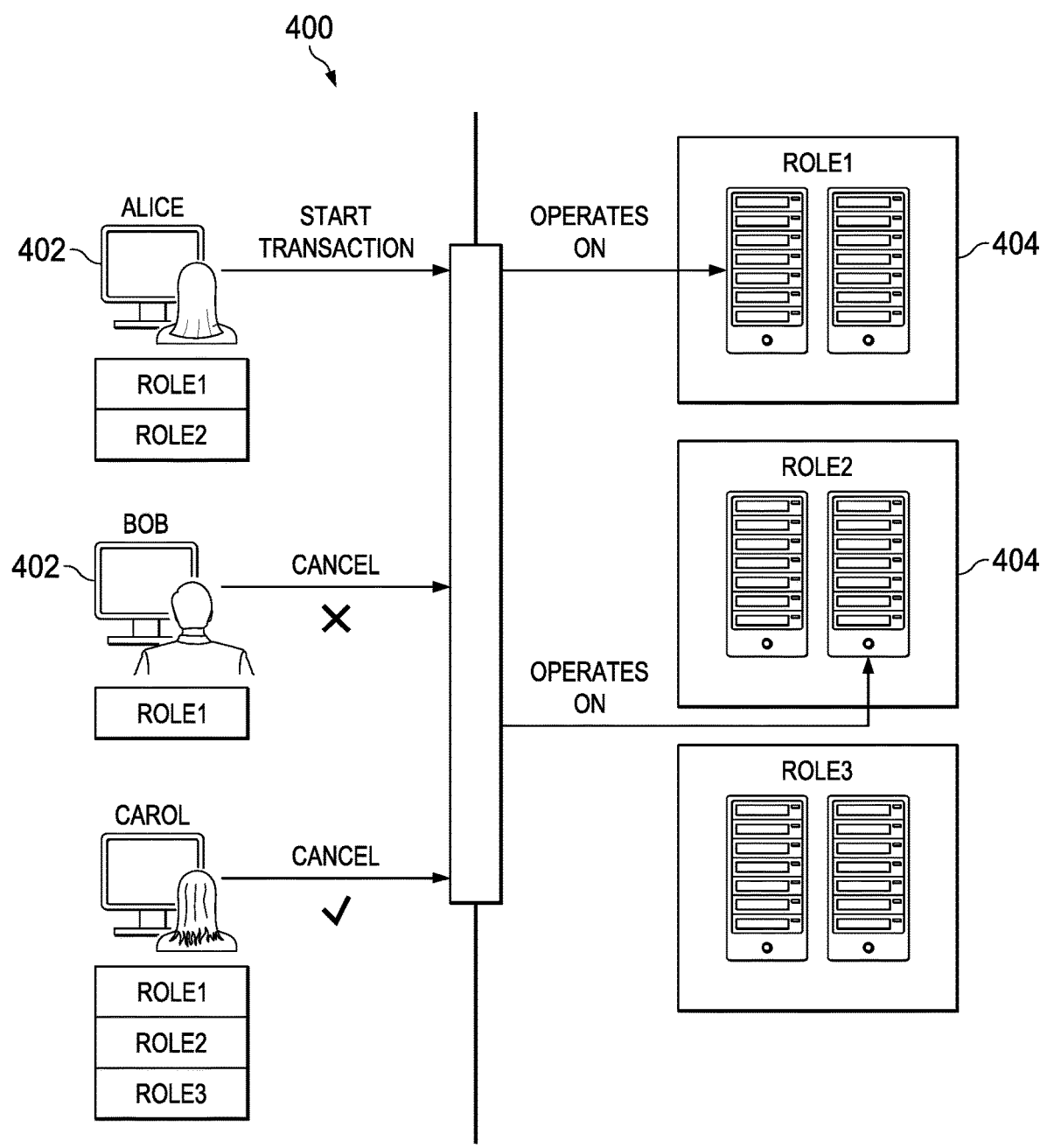
FIG. 4 depicts an operating scenario in which the techniques of this disclosure are carried out.

FIG. 4 depicts a particular operating environment in which the techniques of this disclosure are implemented. In an exemplary enterprise, there is a system 400 with a plurality of operators 402. The operators can be authorized to manage a plurality of resources 404 based on explicit permissions or role membership. The resources may be of various types, such as systems, sub-systems, devices, applications, databases, files, objects, other assets, or combinations thereof. Typically, and as described above, an operator is assigned one or more roles. A role grants an operator permission to perform certain actions, which are referred to herein as "transactions," on the resources. Further, a given operator may be an administrator operator, or a non-administrator operator. Some operators may be "master" operators who have the ability and right to define and grant roles to other operators; conversely, non-master operators can neither define nor grant roles.

A particular transaction is associated with a set of one or more managed resources. The particular nature and scope of the transaction is not a limitation of this disclosure. As will be seen, and according to the techniques herein, a transaction may be started by a first operator but then cancelled or overridden by a second operator, and this is so even if the second operator is a non-master operator. An operator who issues or initiates a transaction is sometimes referred to herein as the "owner" of the transaction.

Given that a particular transaction is issued or initiated by a particular operator, according to this disclosure that transaction is associated with a construct that is referred to herein as a "management scope." Preferably, a management scope for the transaction as used herein refers to a collection of permissions, where that collection is defined by one or more of the following that are assigned to the particular operator that issues/initiates the transaction itself, namely: (a) a set of one or more roles, (b) a set of one or more resource administration rights, and/or (c) combinations thereof. The one or more roles typically are defined in the application within which the access control technique of this disclosure is implemented. Likewise, the one or more resource administration rights typically are defined in the application. A resource administration right determines which resources are controlled by which users of the application. A resource administration right may be defined directly, or indirectly. As used herein, the management scope is said to be "dynamically-generated" because it is instantiated with respect to a particular transaction that is issued/initiated by a particular operator. In other words, until the particular transaction is initiated by the particular operator/user, the collection of permissions is not necessarily known to the access control system. This is not meant to imply that the management scope(s) cannot be determined in advance, only that a particular management scope is not surfaced or otherwise provided in the access control system until the transaction itself actually is initiated. In effect, the management scope is an "implicit" permission set that is based on the roles and permissions explicitly assigned to the operator that issues the transaction.

For example, and as depicted in FIG. 4, assume Alice and Bob are two operators of the system. Alice is assigned Roles 1 and 2, and Bob is assigned Role 1. A third operator Carol is assigned Roles 1, 2 and 3. In this example, it is assumed that neither Alice nor Bob are master operators such that one of them might otherwise be able to interfere with the other's operations. Thus, and as depicted, it is assumed that Alice starts a transaction, e.g., to apply an update X to 10 Linux servers in a lab, and then leaves the lab. Operator Bob finds out that X is the wrong update and should not be applied, but there is no master operator around (e.g., Carol) to cancel Alice's operation, which is in progress. To provide a more concrete example, assume that Alice is granted role "AliceLinux," which is defined with permission to apply updates to the 10 Linux servers. Bob is granted role "BobLinux," which is defined with permission to apply updates to these 10 Linux servers and to 5 other servers. Thus, Alice and Bob were granted different roles. Alice was granted at least one role that Bob was not. In this context, and assuming the techniques of this disclosure are not applied, the access control system does not permit Bob to cancel the operation Alice started.

Now, assume that the technique of this disclosure is implemented. In particular, once Alice has initiated the transaction, the management scope for that transaction is dynamically-generated and made available to the access control system. At this point, it is assumed that a request to cancel the transaction is then received, e.g., from Bob. Again, and to provide a concrete example, Alice was granted role "AliceLinux" which is defined with permission to apply updates to these 10 Linux servers. Bob was granted role "BobLinux" which is defined with permission to apply updates to these 10 Linux servers and to 5 other servers. Assume further that Bob was also granted role "Alice- Linux." In other words, in this example scenario Bob was granted a superset of roles that Alice was granted. When the access control system receives Bob's request to cancel the transaction originally initiated by Alice, the control system may be programmed to cancel the transaction, and whether or not this is possible preferably is based on the relationship between Alice's management scope (the dynamically-generated implicit permission set) and Bob's management scope (the current explicit permissions or role membership).

In RBAC techniques such as described above with respect to FIG. 3, what transactions operator Bob can execute depend on role assignment, group membership, and resource access policy. The access control decision, however, is not changed or otherwise impacted by the roles or permissions of another user, e.g., when another operator's role assignment changes. RBAC has three basic rules for role assignment, role authorization and transaction authorization. The technique of this disclosure differs from RBAC in the transaction authorization rule. In particular, in the approach herein a subject can or cannot execute a transaction based on role assignments of the subject and of other subjects. Thus, and continuing with the previous example, subject Bob can execute an action to cancel the transaction to apply updates on the 10 Linux servers if the set of Bob's role assignments is equal to or a superset of the set of Alice's role assignments.

Figure 5:
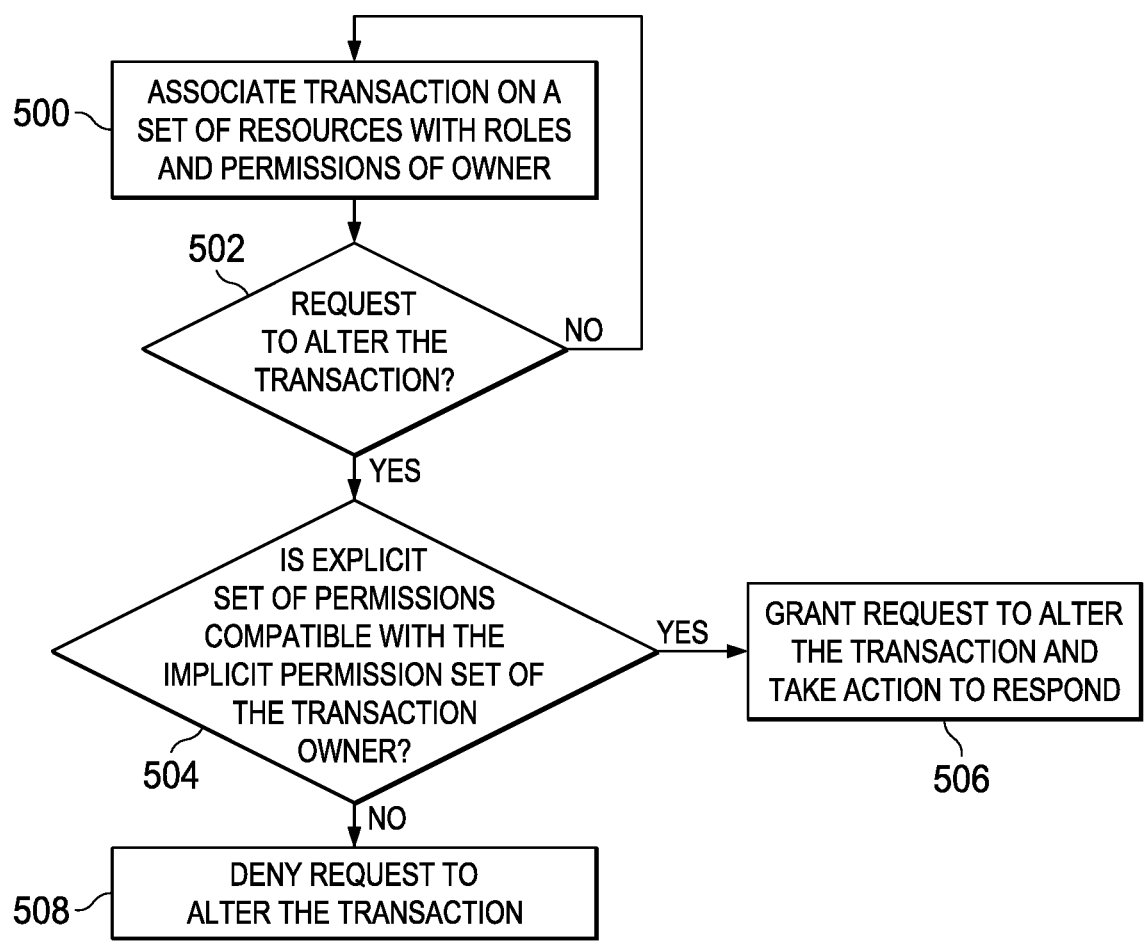
FIG. 5 is a process flow depicting an access control method of this disclosure.

FIG. 5 is a process flow that depicts that high level operation with respect to a particular transaction. Although not depicted, a similar process is carried out for other transactions, typically on a per-transaction basis. At step 500, a transaction on a set of managed resources is associated with the dynamically-generated implicit permission set based on the permissions explicitly assigned to the operator that issued the transaction. The operator that issued the transaction owns the transaction, as has been described. At step 502, a test is performed to determine whether another operator (a non-master) desires to alter the transaction. It is assumed that step 502 is carried out while the original transaction remains pending (i.e., not complete). If no request to alter the transaction is received, the routine cycles. When an operator wants to alter a transaction, however, the routine continues at step 504. At this step, a check is performed to determine whether the permission set assigned explicitly to the current operator is compatible with the implicit permission set associated to the transaction (at step 500) as derived from the permission set of the operator who initiated the transaction. In this manner, the decision whether to allow the operation to continue is based on the relationship between the permissions assigned to the original operator who issued the transaction, and the permissions assigned to the operator who wants to alter it. Thus, step 504 differs from conventional RBAC wherein the determination about whether to allow the transaction to be cancelled would depend on just the permissions assigned to the current operator. As will be described below, the evaluation at step 504 is based on one or more "equal" or "superset" rules. If the rule is met, an appropriate response is provided to the current operator's request to cancel. This is step 506. Typically, this response is the cancellation of the transaction, although other responses (e.g., issuing a notification, providing a programmatic or automated update, or the like). If the rule is not met, however, the original transaction continues at step 508 and the current operator's request is denied.

The above-described approach of using implicit permissions (derived from the transaction-initiator and the nature of the transaction itself) significantly reduces the complexity in explicit permissions management as compared with known RBAC systems.

The following provides additional implementation details. Preferably, and as noted above, each transaction is associated with a dynamically-generated implicit permission set. The implicit permission set constitutes a "management scope" of the transaction, and it is assumed to be available to the access control system once the operator issues the transaction. As noted, the implicit permission set is dynamically-generated as the set of assigned roles and resource administration rights (i.e., explicit resource permissions) for the operator that issued the transaction. When the follow-on operator wants to alter the transaction, the permission set assigned explicitly to the follow-on operator is checked to determine whether it is compatible with the implicit permission set associated to the transaction. In one embodiment, the implementation checks that the current operator's management scope is a superset of the management scope associated with the transaction that is being altered. When the set of roles (and/or the resource administration rights) associated with the current operator is the same or contains the set of roles (and/or the resource administration rights) associated with the transaction, the alteration operation is allowed. It is not required that the roles are exactly the same if the set of resources managed by the roles can be determined, for instance, when the resources are assigned explicitly to the roles, so that the sets of managed resources can be easily compared.

While the typical implementation will involve the current or follow-on operator seeking to cancel the then-pending transaction, the notion of cancellation is not intended to be limited. All that is required is that the second operator provide some request that implicates the then-pending transaction in some manner. The access control system then uses the approach herein to determine whether or not to apply whatever action is dictated by the request from the follow-on operator.

The following describes several different methods to determine authorization for operations within an application. These methods are exemplary, and typically they are implemented within the access control system by one or more rules. The rules are applied in any convenient programmatic or automated manner.

A first method computes access control based on membership in user groups defined within the application, called roles. Equal or superset rules are then applied for access control between roles. Preferably, the equal rule is defined as follows. When user A and user B have each been granted role R1 and no other roles, then A is granted access control over operations initiated by user B, and user B is granted access control over operations initiated by user A. Preferably, a superset rule is defined as follows. If a user A has been granted role R1, and a user B has been granted roles R1 and R2, then user B is granted access control over operations initiated by user A. As noted above, preferably the equal and superset rules are checked dynamically by the application at execution time for the application operations. This is different from other methods like RBAC, which statically grant to a user access control for specific operations on specific resources, independent of any roles given to other users. This first method is implemented by verifying that the set of roles for the user owning the transaction is the same or contained in the set of roles for the user that wants to alter the transaction. The method dynamically computes access control based on the roles of the user and other users.

A second method determines which resources are controlled by which users of the application, i.e., by evaluating resource administration rights. In this scenario, preferably equal and superset rules also are applied. For example, if a user A has been granted administration rights over resources (or resource groups) named Win and Mac, and a user B has been granted administration rights over resources named Win, Nix and Mac, then user B is granted access control over operations initiated by user A. The second method is implemented by verifying that the set of resources administered by the user owning the transaction is the same or contained in the set of resources explicitly administered by the user that wants to alter the transaction.

A third method is just a combination of the first and second methods, such that access control is determined by equal and superset rules applied to both roles and resource administration rights applied to all users of the application. This method is implemented by verifying that both the above-identified conditions (for each individual method) apply. Resource administration rights typically are determined directly, e.g., from stored information sources that define them. In a fourth method, effective resource administration rights are computed by the application indirectly (i.e., based on indirect ways of granting resource admin rights), for example, via roles and any other ways of defining which user has access to which resources (or resource groups). Equal and superset rules are then applied on the effective resource administration rights to determine a user's access control on operations of a different user. This method is implemented for roles and explicit resource assignments based on specific resource identities. One approach to implement this fourth method is to create a set of the resources administered by all roles assigned to the user owning the transaction and the resources explicitly assigned to that same user, and then to compare that set to the equivalent set constructed for the user that wants to alter the transaction.

The techniques herein may be implemented in various types of computing infrastructures. One example is IBM® BigFix, which is a suite of products that provides a solution for compliance, endpoint, and security management and allows organizations to see and manage physical and virtual endpoints through a single infrastructure, a single console, and a single type of agent. This solution provides a multi-layered technology platform that acts as a core part of a global IT infrastructure. The platform is a dynamic, content-driven messaging and management system that distributes the work of managing IT infrastructures out to the managed devices themselves, the agents. The platform can manage up to hundreds of thousands of physical and virtual computers, over private or public networks, including servers, desktops, roaming laptops, mobile phones, point-of-sale devices, self-service kiosks and other network-connected machines. The platform supports various operating systems. In this approach, a single intelligent agent provides for continuous endpoint self-assessment and policy enforcement, real-time visibility and control from a single management console, management of thousands of endpoints regardless of location, connection type, or status, targeting of specific actions to an exact type of endpoint configuration or user type, management of complexity and cost reduction, increasing accuracy, and boosting productivity, patch management, software distribution, and operating system deployment, support for heterogeneous platforms, mobile device management, automatic endpoint assessment and vulnerability remediation, real-time protection from malware and other vulnerabilities, and server automation.

Figure 6:
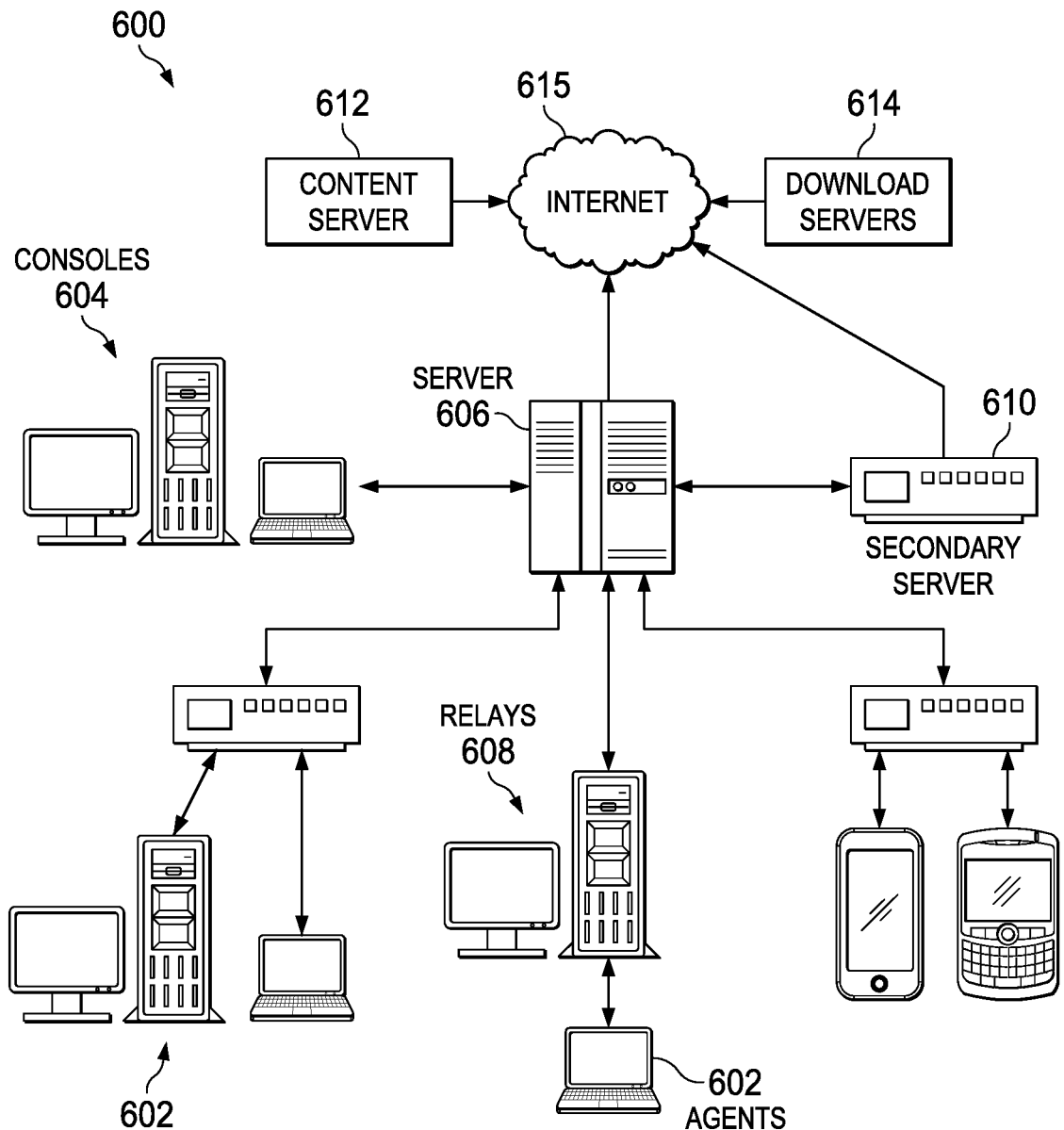
FIG. 6 depicts a representative distributed computing environment in which the techniques of this disclosure may be implemented.

As depicted in FIG. 6, a solution 600 of this type comprises an intelligent agent 602, a console 604, a server 60, optionally one or more relays 608, and an optional secondary server 610. The intelligent agent 602 is a small piece of code that is installed on each computer to be managed. The agent continuously assesses the state of the endpoint against a stated policy, whether connected to the network or not. As soon as the agent notices that a target is out of compliance with a policy or checklist, it informs the server 606, runs a configured remediation task, and immediately notifies the server of the task status and result. In most cases, the agent operates silently, without any direct intervention from the user. A computer with the IBM BigFix agent installed is also referred to as a client. The console 604 is provided to manage the solution; thus, depending on the supported application, the console facilitates various functions such as endpoint protection, systems lifecycle management, software distribution, security configuration and vulnerability management, and so forth. An operator with the required privileges can quickly and easily distribute a fix to only those computers that need it, with no impact on the rest of the network. The server 606 coordinates the flow of information to and from individual clients and stores the results in a database. The server 606 manages policy-based content and allows the operator to maintain real-time visibility and control over all devices in the environment. Preferably, the content is delivered in messages that are updated continuously, e.g., using a content delivery cloud-based service 612. Because most of the analysis, processing, and enforcement work is done by the agent rather than the server, one server can support up thousands of endpoints. When necessary, high availability is enabled by employing multiple servers.

One or more relays may be implemented and facilitate a lightweight and robust architecture. A relay 608 is a client that is enhanced with a relay service, and it may be an existing computing system. It performs all client actions to protect the host computer, and in addition, delivers content 612 and software downloads 614 to child clients and relays, e.g., via the Internet 615. Instead of requiring every networked computer to directly access the server, relays can be used to offload much of the burden. Hundreds of clients can point to a relay for downloads, which in turn makes only a single request to the server. Relays can connect to other relays as well, further increasing efficiency. Promoting an agent to a relay does not require dedicated hardware or network configuration changes.

The secondary server 610 replicates the server information for disaster recovery. The console 604 supports web-based reporting by which the user can produce charts and graphs of data, maintain audit trials, and so forth. The interface runs in a web browser and provides a set of users with visibility into the state of the computers.

The agent(s) perform multiple functions including continuous self-assessment and policy enforcement, all with minimal system impact. The server and console are highly-secure, and highly-scalable, and they provide aggregated data, analysis and reporting, as well as the ability to push out to the endpoints pre-defined or custom policies. Existing systems can be used as relays and to provide built-in redundancy, as well as to support and secure roaming endpoints.

The solution comprises one or more applications that provide consolidated security and operations management, simplified and streamlined endpoint management, while increasing accuracy and productivity. These include, without limitation, lifecycle management (e.g., operating system deployment, power management, remote control, server automation, software distribution, etc.), automated patching to all distributed endpoints, automated remediation, inventory management, vulnerability protection, and the like.

The technique herein provides significant advantages. The approach authorizes a user based on a dynamic check of roles and/or permissions of that user relative to other user(s) when executing an operation; unlike the prior art, authorization is not determined through a static assignment, i.e., authorizing a user based on roles and permissions assigned statically to only the user seeking to take some action. The approach dynamically permits new actions by administrators using implicit roles that are not actually created/stored, and can apply more broadly to any RBAC-based application or system. Additionally, the technique provides an administrator the ability to take action on another administrator's actions based on how their permissions compare, rather than granting new actions against a resource or based on resource access control. The technique simplifies the complex role assignment matrix that traditional RBAC would require to grant different permissions to act on other administrator's actions and update those permissions as administrators are added, removed, or modified. It does so using a run-time check of dynamically-created implicit roles, as opposed to creating and assigning roles ahead of time. The technique enables changing access permission automatically, but based on other operator permissions, as opposed to usage of an underlying resource or other operational constraints.

According to the described approach, a single transaction can be issued against resources assigned to different roles and permissions. Each transaction in effect has associated therewith a new dynamically-generated collection of permissions that is created from the set of roles and explicit permissions that are assigned to the issuer of the transaction. When another user wants to alter that transaction, the access control system simply requires that the collection of permissions assigned through a set of roles and explicit permissions are compatible with this implicit transaction permission set.

The technique herein provides for dynamic evaluation of access control, which is inferred from static assignment of access control. In this disclosure, access is inferred dynamically, but it is possible (with an increase in complexity for the administrator) to define access completely statically within RBAC. And although access is inferred dynamically, preferably it is not derived from a definition expressed using a particular language but, rather, by the relationship of the set of permissions for the different users involved.

While the technique herein typically is implemented within an access control system itself, this is not a requirement. The functionality may be implemented in a system, sub-system, device, program or process that operates in association with the access control system, in which case the outcome of the management scope rule evaluation is communicated to the access control system.

The functionality described above may be implemented as a standalone approach, e.g., a software-based function executed by one or more hardware processors, or it may be available as a managed service (including as a web service via a SOAP/XML interface). The particular hardware and software implementation details described herein are merely for illustrative purposes and are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The technique described herein also may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the endpoint identity and tracking functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the process flows described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing intrusion detection system solution.

Without meant to be limiting, preferably a management server management console exposes one or more web-based interfaces that may be used to configure, manage and administer the system.

The described functionality may be implemented as an adjunct or extension to an existing identity management solution, product, or service.

While the above describes a particular order of operations performed by certain embodiments of the disclosed technique, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques herein may be implemented in other types of access control systems besides RBAC. Thus, for example, the approach described herein may be applied to user-based access control, attribute-based access control, discretionary access control (DAC), mandatory access control (MAC), other life cycle management schemes, and the like.

The techniques herein provide for an improvement to an existing technique or technology, namely a role-based access control system, or the like.

Having described our invention, what we claim is as follows.

Having described our invention, what we claim is as follows:

1. A method of access control from within an application in association with an access control system, comprising:
    upon initiation of a transaction associated with a set of managed resources, dynamically generating and providing the access control system a management scope for the transaction, the management scope being a collection of permissions defined by at least one of: a set of one or more roles, and one or more resource administration rights, that are assigned to a first operator that initiates the transaction;
    while the transaction executes, and upon receipt of a request to alter the transaction, the request being associated with a second operator distinct from the first operator, evaluating the management scope for the transaction and associated with the first operator against a management scope associated with the second operator; and
    upon determining that the management scope associated with the first operator has a given relationship to the management scope for the second operator, and while the transaction executes, permitting the transaction to be altered by the second operator in response to the request;
    wherein each of the first and second operators are human operators.

2. The method as described in claim 1 wherein the given relationship is defined by an equal rule that specifies that a set of roles or a set of resource administration rights for the second operator correspond to those of the first operator.

3. The method as described in claim 1 wherein the given relationship is defined by a superset rule that specifies that a set of roles or a set of resource administration rights for the second operator contains those of the first operator.

4. The method as described in claim 1 wherein the given relationship is defined by an equal rule together with a superset rule, the equal rule specifying that a set of roles or a set of resource administration rights for the second operator correspond to those of the first operator, and the superset rule specifying that a set of roles or a set of resource administration rights for the second operator contain those of the first operator.

5. The method as described in claim 3 wherein the resource administration rights for the second operator are obtained by evaluating other information.

6. The method as described in claim 1 wherein the collection of permissions is defined within the application.

7. Apparatus, comprising:
    a hardware processor;
    computer memory holding computer program instructions executed by the hardware processor to provide access control from within an application in association with an access control system, the computer program instructions comprising program code configured to:
        upon initiation of a transaction associated with a set of managed resources, dynamically generate and provide to the access control system a management scope for the transaction, the management scope being a collection of permissions defined by at least one of: a set of one or more roles, and one or more resource administration rights, that are assigned to a first operator that initiates the transaction;
        while the transaction executes, and upon receipt of a request to alter the transaction, the request being associated with a second operator distinct from the first operator, evaluate the management scope for the transaction and associated with the first operator against a management scope associated with the second operator; and
        upon determining that the management scope associated with the first operator has a given relationship to the management scope for the second operator, and while the transaction executes, permit the transaction to be altered by the second operator in response to the request;
        wherein each of the first and second operators are human operators.

8. The apparatus as described in claim 7 wherein the given relationship is defined by an equal rule that specifies that a set of roles or a set of resource administration rights for the second operator correspond to those of the first operator.

9. The apparatus as described in claim 7 wherein the given relationship is defined by a superset rule that specifies that a set of roles or a set of resource administration rights for the second operator contains those of the first operator.

10. The apparatus as described in claim 7 wherein the given relationship is defined by an equal rule together with a superset rule, the equal rule specifying that a set of roles or a set of resource administration rights for the second operator correspond to those of the first operator, and the superset rule specifying that a set of roles or a set of resource administration rights for the second operator contain those of the first operator.

11. The apparatus as described in claim 9 wherein the resource administration rights for the second operator are obtained by evaluating other information.

12. The apparatus as described in claim 7 wherein the collection of permissions is defined within the application.

13. A computer program product in a non-transitory computer readable medium, the computer program product holding computer program instructions which, when executed by a data processing system, perform access control in association with an access control system, the computer program instructions configured to:

upon initiation of a transaction associated with a set of managed resources, dynamically generate and provide to the access control system a management scope for the transaction, the management scope being a collection of permissions defined by at least one of: a set of one or more roles, and one or more resource administration rights, that are assigned to a first operator that initiates the transaction;

while the transaction executes, and upon receipt of a request to alter the transaction, the request being associated with a second operator distinct from the first operator, evaluate the management scope for the transaction and associated with the first operator against a management scope associated with the second operator; and upon determining that the management scope associated with the first operator has a given relationship to the management scope for the second operator, and while the transaction executes, permit the transaction to be altered by the second operator in response to the request;

wherein each of the first and second operators are human operators.

14. The computer program product as described in claim 13 wherein the given relationship is defined by an equal rule that specifies that a set of roles or a set of resource administration rights for the second operator correspond to those of the first operator.

15. The computer program product as described in claim 13 wherein the given relationship is defined by a superset rule that specifies that a set of roles or a set of resource administration rights for the second operator contains those of the first operator.

16. The computer program product as described in claim 13 wherein the given relationship is defined by an equal rule together with a superset rule, the equal rule specifying that a set of roles or a set of resource administration rights for the second operator correspond to those of the first operator, and the superset rule specifying that a set of roles or a set of resource administration rights for the second operator contain those of the first operator.

17. The computer program product as described in claim 15 wherein the resource administration rights for the second operator are obtained by evaluating other information.

18. The computer program product as described in claim 13 wherein the collection of permissions is defined within the application.

* * * * *